(12) United States Patent
Miller et al.

(10) Patent No.: US 6,321,779 B1
(45) Date of Patent: Nov. 27, 2001

(54) PRESSURE REGULATOR

(75) Inventors: Gary W Miller, Livonia; Thomas Dean Barker, Novi; Sathish Atluri, Canton; Garth J Schultz, Oxford, all of MI (US); Stephen A Carter, Mississauga (CA)

(73) Assignee: Veritek NGV, Corp., Troy, MI (US)

( * ) Notice: Subject to any disclaimer, the term of this patent is extended or adjusted under 35 U.S.C. 154(b) by 0 days.

(21) Appl. No.: 09/642,747

(22) Filed: Aug. 18, 2000

Related U.S. Application Data (63) Continuation-in-part of application No. 09/314,756, filed on May 19, 1999, now Pat. No. 6,186,168.

(51) Int. Cl.$^7$ .................................................. G05D 16/10
(52) U.S. Cl. ...................... 137/340; 137/505.25; 137/507
(58) Field of Search ............................... 137/505.25, 507, 137/584, 592, 340

(56) References Cited

U.S. PATENT DOCUMENTS

| | | |
|---|---|---|
| 475,217 * | 5/1892 | Heithecker . |
| 664,383 | 12/1900 | Claude et al. . |
| 903,134 | 11/1908 | Giron . |
| 1,734,514 | 11/1929 | Benson et al. . |
| 1,799,914 | 4/1931 | Trouillet . |
| 2,294,432 | 9/1942 | Weidner . |
| 2,731,033 | 1/1956 | Cable . |
| 2,793,504 | 5/1957 | Webster . |
| 2,987,570 | 6/1961 | Bluth . |
| 3,059,210 | 10/1962 | Luenberger . |
| 3,084,210 | 4/1963 | Bluth et al. . |
| 3,094,141 | 6/1963 | Maienknecht . |
| 3,109,882 | 11/1963 | Maltby . |
| 3,118,295 | 1/1964 | Poppel . |
| 3,164,308 | 1/1965 | Marcovitch et al. . |
| 3,211,175 | 10/1965 | Replogle . |
| 3,352,963 | 11/1967 | Homrig . |
| 3,386,072 | 5/1968 | Chandler . |
| 3,520,989 | 7/1970 | Funk et al. . |
| 3,565,201 | 2/1971 | Petsinger . |
| 3,698,425 * | 10/1972 | Fisher .............................. 137/505.25 |
| 3,789,820 | 2/1974 | Douglas et al. . |
| 4,020,863 | 5/1977 | Fabish . |
| 4,173,986 | 11/1979 | Martin . |
| 4,458,108 | 7/1984 | Kashimoto et al. . |
| 4,481,969 | 11/1984 | Fallon et al. . |
| 4,489,700 | 12/1984 | van der Weide . |
| 4,520,838 | 6/1985 | Fisher et al. . |
| 4,561,465 | 12/1985 | Rogers . |
| 4,572,477 | 2/1986 | Phlipot et al. . |
| 4,599,487 | 7/1986 | Blank et al. . |
| 4,611,628 | 9/1986 | Pasternack . |
| 4,643,215 | 2/1987 | Phlipot et al. . |
| 4,655,246 | 4/1987 | Phlipot et al. . |
| 4,718,638 | 1/1988 | Phlipot et al. . |
| 4,723,567 | 2/1988 | Phlipot et al. . |
| 4,785,847 | 11/1988 | Steer et al. . |
| 4,791,957 | 12/1988 | Ross . |

(List continued on next page.)

*Primary Examiner*—Stephen M. Hepperle
(74) *Attorney, Agent, or Firm*—Brooks & Kushman PC (57) ABSTRACT

A regulator for regulating outlet pressure of a fluid supplied to the regulator from a fluid source includes a body having an inlet, and a pressure regulating chamber disposed in the body. A high pressure fluid circuit extends between the inlet and the pressure regulating chamber for transmitting the fluid from the inlet to the pressure regulating chamber. The high pressure fluid circuit includes at least two longitudinally extending high pressure passages in fluid communication with each other. One longitudinally extending high pressure passage transmits the fluid in a first direction, and another longitudinally extending high pressure passage transmits the fluid in a second direction different than the first direction.

26 Claims, 9 Drawing Sheets

U.S. PATENT DOCUMENTS

| | | |
|---|---|---|
| 4,811,752 | 3/1989 | Lyons et al. . |
| 4,817,658 | 4/1989 | Lyons . |
| 4,820,889 | 4/1989 | Seghetti . |
| 4,858,583 | 8/1989 | Sonntag . |
| 4,887,638 | 12/1989 | Hellquist et al. . |
| 4,971,224 | 11/1990 | Scremin . |
| 5,009,249 | 4/1991 | Fisher et al. . |
| 5,025,758 | 6/1991 | Djurdjevic . |
| 5,026,026 | 6/1991 | Sever et al. . |
| 5,029,730 | 7/1991 | Kostecki et al. . |
| 5,088,622 | 2/1992 | Valy et al. . |
| 5,193,580 | 3/1993 | Wass et al. . |
| 5,197,671 | 3/1993 | Wass et al. . |
| 5,197,710 | 3/1993 | Wass et al. . |
| 5,330,031 | 7/1994 | Hill et al. . |
| 5,341,844 | 8/1994 | Wass et al. . |
| 5,379,761 | 1/1995 | Schuler . |
| 5,452,738 | 9/1995 | Borland et al. . |
| 5,458,151 | 10/1995 | Wass . |
| 5,495,865 | 3/1996 | Wass et al. . |
| 5,507,308 | 4/1996 | Cahmbonnet . |
| 5,562,117 | 10/1996 | Borland et al. . |
| 5,566,713 | 10/1996 | Lhomer et al. . |
| 5,611,316 | 3/1997 | Oshima et al. . |
| 5,635,770 | 6/1997 | Evans, Jr. et al. . |
| 5,644,104 | 7/1997 | Porter et al. . |
| 5,651,477 | 7/1997 | Takahashi et al. . |
| 5,678,602 * | 10/1997 | Cannet et al. .................. 137/505.25 |
| 5,755,254 | 5/1998 | Carter et al. . |
| 5,799,640 | 9/1998 | Sugimoto et al. . |
| 5,829,418 | 11/1998 | Tamura et al. . |
| 5,899,221 | 5/1999 | Holt et al. . |
| 6,041,762 | 3/2000 | Sirosh et al. . |
| 6,186,168 * | 2/2001 | Schultz et al. .................. 137/505.11 |

* cited by examiner

PRESSURE REGULATOR

CROSS-REFERENCE TO RELATED APPLICATIONS

This application is a continuation-in-part of Ser. No. 09/314,756, filed on May 19, 1999, now U.S. Pat. No. 6,186,168.

TECHNICAL FIELD

The invention relates to a pressure regulator including a body having at least two longitudinally extending high pressure passages for routing high pressure fluid through the regulator.

BACKGROUND ART

Alternatively-fueled motor vehicles, i.e., those which operate solely or partially on a fuel other than gasoline or diesel fuel, are proliferating. Many such alternate fuel vehicles use fuel injectors that draw fuel from a tank that stores the alternate fuel in a highly pressurized, normally gaseous state. It is known to use a pressure regulator to control fuel pressure supplied to the fuel injectors, wherein the pressure regulator attempts to maintain a constant outlet pressure as tank pressure varies and/or as fuel flow rate varies.

Known pressure regulators typically include a body having a relatively short and straight high pressure fluid circuit for routing fuel from an inlet to a pressure regulating chamber. Such a fluid circuit, however, does not provide much opportunity for heat transfer to occur between the body and the fuel. As a result, it is difficult to sufficiently heat fuel so as to prevent hydrate formation in such regulators.

DISCLOSURE OF INVENTION

The present invention addresses the shortcomings of the prior art by providing an improved regulator that significantly increases heat transfer between the regulator and a fluid passing through the regulator. As a result, the regulator of the invention may be used for relatively high flow rate applications.

In one embodiment of the invention, a regulator for regulating outlet pressure of a fluid supplied to the regulator from a fluid source includes a body having an inlet, and a pressure regulating chamber disposed in the body. A high pressure fluid circuit extends between the inlet and the pressure regulating chamber for transmitting the fluid from the inlet to the pressure regulating chamber. The high pressure fluid circuit includes a longitudinally extending high pressure passage that extends longitudinally away from the inlet and beyond the pressure regulating chamber.

With such a configuration, the high pressure fluid circuit causes the fluid to change flow direction between the inlet and the pressure regulating chamber, thereby increasing turbulence in the fluid. As a result, heat transfer between the body and the fluid is improved compared with prior regulators. The high pressure fluid circuit also improves contact between the body and the fluid, thereby improving heat transfer between the body and the fluid. Furthermore, the high pressure fluid circuit may include an additional longitudinally extending high pressure passage disposed between the longitudinally extending high pressure passage and the pressure regulating chamber.

The regulator may also include first and second pistons disposed proximate the pressure regulating chamber and cooperating to regulate the outlet pressure of the fluid. The pistons preferably have a common axis that is offset from a central axis of the body so that sufficient space is provided for the high pressure fluid circuit.

In another embodiment of the invention, a regulator for regulating outlet pressure of a fluid supplied to the regulator from a fluid source includes a body having an inlet, and a pressure regulating chamber disposed in the body. A high pressure fluid circuit extends between the inlet and the pressure regulating chamber for transmitting the fluid from the inlet to the pressure regulating chamber. The high pressure fluid circuit includes at least two longitudinally extending high pressure passages in fluid communication with each other. One longitudinally extending high pressure passage transmits the fluid in a first direction, and another longitudinally extending high pressure passage transmits the fluid in a second direction different than the first direction.

With such a configuration, turbulent flow through the regulator is enhanced. Furthermore, contact between the body and the fluid is significantly improved compared with prior regulators. In other words, the body-surface to fluid-volume ratio is significantly improved.

Preferably, the first direction is axially opposite the second direction. Furthermore, the high pressure fluid circuit may comprise at least five longitudinally extending high pressure passages to further increase heat transfer between the body and the fluid.

The body also preferably includes a heating fluid circuit for routing heating fluid through the regulator. The heating fluid circuit has a configuration that includes at least five portions at which flow of heating fluid changes direction. Thus, the heating fluid circuit enhances turbulent flow through the regulator. More specifically, the heating fluid circuit preferably includes a heating fluid inlet, a heating fluid outlet, at least two longitudinally extending heating fluid passages, and at least five laterally extending heating fluid passages in fluid communication with the longitudinally extending heating fluid passages. The heating fluid passages are disposed between the heating fluid inlet and the heating fluid outlet and are configured to transmit heating fluid between the heating fluid inlet and the heating fluid outlet.

Further under the invention, a regulator for regulating outlet pressure of a fluid contained in a tank includes a body having an inlet adapted to be in fluid communication with the tank. The regulator further includes a pressure regulating chamber disposed in the body, and a high pressure fluid circuit extending between the inlet and the pressure regulating chamber for transmitting the fluid from the inlet to the pressure regulating chamber. The high pressure fluid circuit includes at least two longitudinally extending high pressure passages in fluid communication with each other. One longitudinally extending high pressure passage transmits the fluid in a first direction, and another longitudinally extending high pressure passage transmits the fluid in a second direction different than the first direction. The regulator also includes a first piston having an end disposed proximate the pressure regulating chamber. The first piston is movable in response to pressure in the tank when exposed to the pressure in the tank. In addition, the regulator includes a second piston having an end disposed proximate the pressure regulating chamber. The second piston is movable toward and away from the end of the first piston in response to the outlet pressure. The ends of the first and second pistons are separated by a first distance to allow the fluid to flow out of the tank, and the ends of the first and second pistons are positioned closer together than the first distance to inhibit flow out of the tank when the outlet pressure reaches a threshold.

The first piston preferably further has a first axial bore that defines at least a portion of one of the longitudinally extending passages. Furthermore, the body preferably has an outlet, and the second piston has a second axial bore in fluid communication with the outlet such that fluid flows through the second axial bore before flowing out of the outlet. The regulator may also be configured such that the outlet and the pistons have a common axis.

Moreover, the regulator may be configured such that the body has a first axis, and the pistons have a common second axis offset from the first axis. With such a configuration, significant space is provided for the longitudinally extending high pressure passages.

The regulator may further include a first spring for biasing the first piston away from the second piston, a second spring for biasing the second piston away from the first piston, and an adjuster cooperable with one piston for moving the one piston with respect to the other piston without affecting spring load of either spring. As a result, outlet pressure may be effectively adjusted without pre-loading either spring.

These and other objects, features, and advantages of the present invention are readily apparent from the following detailed description of the best modes for carrying out the invention when taken in conjunction with the accompanying drawings.

BEST MODE FOR CARRYING OUT THE INVENTION

Figure 1:
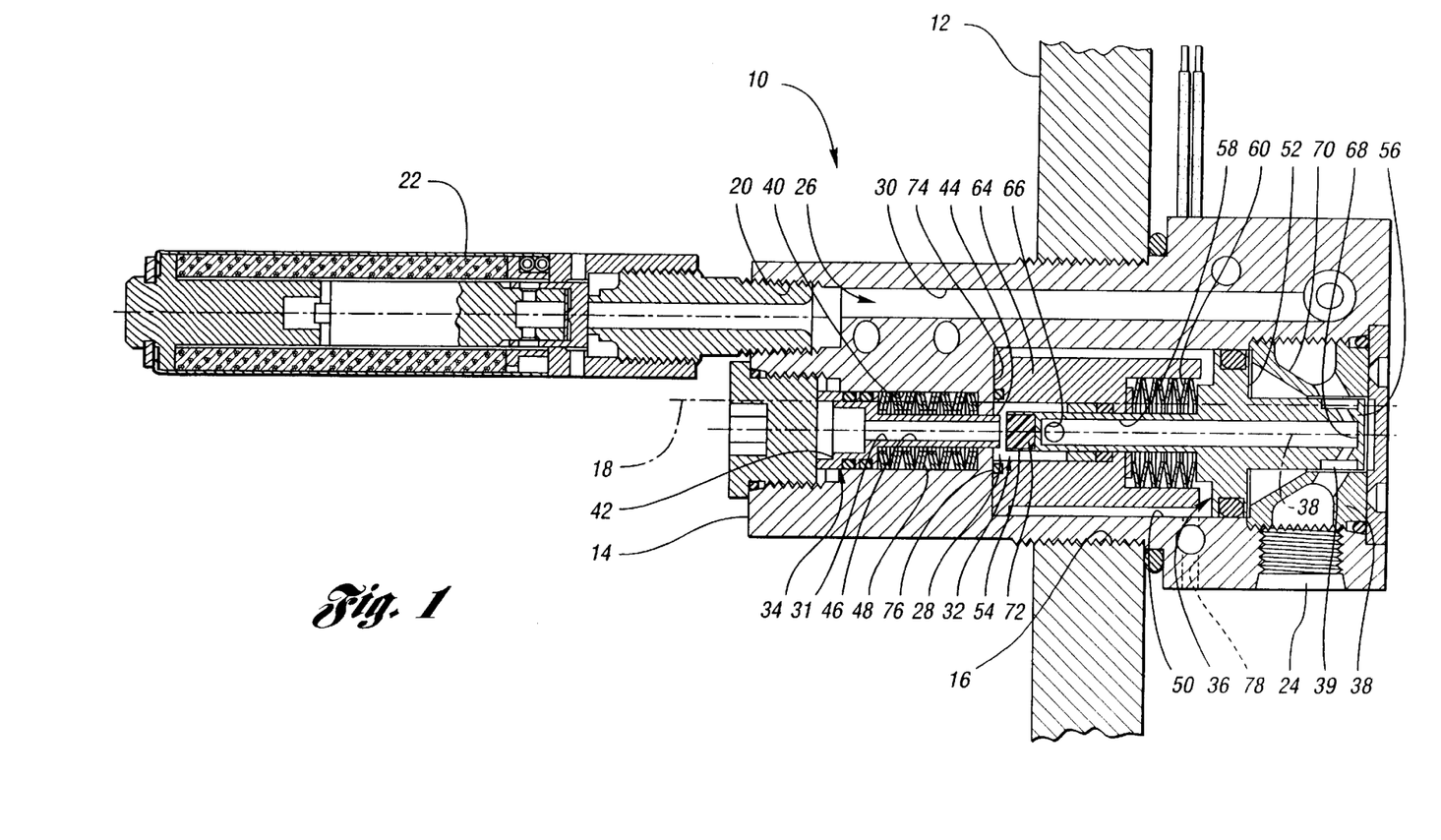
FIG. 1 is a side cross-sectional view of a pressure regulator according to the present invention in cooperation with an un-pressurized tank.

FIGS. 1 shows a pressure regulator 10 according to the present invention for regulating outlet pressure of a fluid contained in a cylinder or tank 12. In a preferred embodiment where the tank 12 is fitted in a vehicle, the fluid may for example be compressed natural gas, liquified natural gas, propane, hydrogen or other fuel. In other applications, the fluid may be for example carbon dioxide, oxygen or other commercial gases, or pressurized liquids.

The regulator 10 includes a body 14, which may also be referred to as a block, threadably engaged with a neck 16 of the tank 12. The body 14 and the neck 16 preferably share a common central axis 18. The body 14 has an inlet 20 connected to a solenoid 22, which is disposed in the tank 12. Furthermore, the body 14 has an outlet 24, which may be connected to a low pressure line (not shown) for supplying regulated fluid to, for example, a vehicle engine.

The regulator 10 further has a high pressure fluid circuit 26 for routing high pressure fluid from the inlet 20 to a low pressure chamber or pressure regulating chamber 28. The fluid circuit 26 includes a plurality of longitudinally extending passages such as first and second longitudinal passages 30 and 31, respectively. The first longitudinal passage 30 is formed in the body 14 and extends from the inlet 20 to a point longitudinally beyond the regulating chamber 28. The fluid circuit 26 further includes additional passages (not shown) disposed between the first and second longitudinal passage 30 and 31, respectively.

The regulator 10 also includes a pressure regulating device 32 that extends into the pressure regulating chamber 28 for reducing pressure of the fluid. The pressure regulating device 32 includes a first or compensation piston 34 and a second or main piston 36. The pistons 34 and 36 preferably have a common central axis 38 that is offset from the central axis 18 so as to provide sufficient space for the fluid circuit 26.

The compensation piston 34 is situated in a bore 40 in the body 14, and includes a head 42, a distal end 44, and a first axial bore 46 that defines at least a portion of the second longitudinal passage 31. A compensation spring 48 is also disposed in the bore 40 and is engageable with the compensation piston 34. When the compensation spring 48 is compressed, the compensation spring bears against the underside of the head 42, and biases the compensation piston 34 in a first, axial direction.

The main piston 36 is situated in a bore 50 in the body 14, and includes a head 52, a distal end 54, an extension 56, and a second axial bore 58. A main spring 60 is also disposed in the bore 50 and is engageable with the main piston 36. When the main spring 60 is compressed, the main spring 60 bears against the underside of the head 52, and biases the main piston 36 in a second, axial direction opposite the first axial direction.

Figure 2:
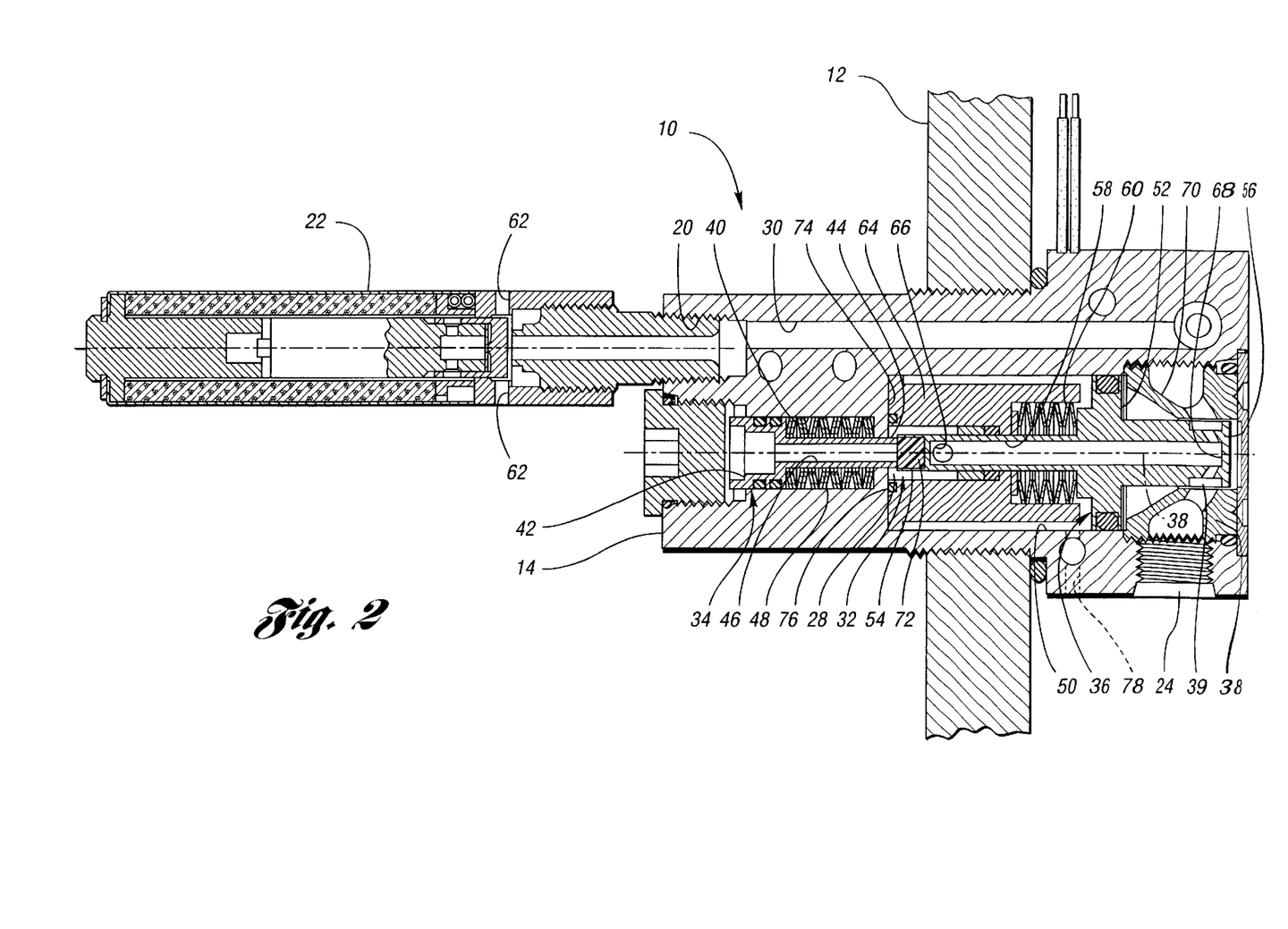
FIG. 2 is a side cross-sectional view of the pressure regulator and a pressurized tank.

Referring to FIG. 2, operation of the regulator 10 will now be described. When the solenoid 22 is energized, fluid from the tank 12 will enter the solenoid 22 through openings 62. Next, fluid enters the regulator 10 through the inlet 20, and passes into the first longitudinal passage 30. The fluid then passes through additional passages (not shown) and to the head 42 of the compensation piston 34. When the head 42 of the compensation piston 34 is exposed to pressure in the tank 12, the pressure acts on the effective cross-sectional area of the head 42 to move the compensation piston 34 against the bias of the compensation spring 48 and compresses the compensation spring 48, Next, the fluid passes through the first axial bore 46 and into the regulating chamber 28, which is defined in a tower 64. From the regulating chamber 28, the fluid normally passes through one or more holes 66 in the main piston 36 proximate the distal end 54, and through the second axial bore 58 to impinge on an end 68 of the extension 56. This action contributes a dynamic force tending to add to the opening force developed by the main spring 60. Additionally, the extension 56 diverts the flow of fluid at an angle greater than ninety degrees to its former axial flow, and over a conical surface 70. The flow over the conical surface 70 draws fluid away from the main piston head 52, thereby lowering the static pressure bearing against the main piston head 52, slightly diminishing the force tending to close the main piston 36.

These forces are factored in when selecting the springs 48 and 60. While each spring 48 and 60 may be any suitable type of spring, such as a coil spring, each spring 48 and 60 preferably comprise a plurality of Belleville washers. Furthermore, the springs 48 and 60 are preferably ratiometric (i.e., the spring constants are proportional), and are chosen so that a constant outlet pressure is attained at the outlet 24 for normal flow rates and for normal operating tank pressures. In a natural gas vehicle, the target outlet pressure is normally about 100 pounds per square inch, gauge (psig), for tank pressures of about 125 to 4,500 psig. The outlet pressure, minus the loss created by the flow over the conical surface 70, acts on the head 52 of the main piston 36 to move it against the bias of the main spring 60. If the outlet pressure exceeds the desired value, the main piston 36 is driven toward the compensation piston 34 such that a seat 72 attached at or proximate the distal end 54 of the main piston 36 mates with the distal end 44 of the compensation piston 34 to inhibit flow out of the tank. While the seat 72 may comprise any suitable material, such as brass or aluminum, the seat 72 preferably comprises a relatively hard thermoplastic material such as VESPEL™, which is available from DuPont.

If the outlet pressure then drops below a threshold, as for example when a fuel injector might demand more fuel for delivery to an engine, the main piston 36 is biased away from the compensation piston 34, the ends of the pistons separate, and the flow of fuel out of the tank resumes. In the preferred embodiment, the main piston 36 has a maximum stroke of about 0.001 inches at 3600 psi, and about 0.008 inches at 500 psi tank pressure. However, the main piston 36 may have any suitable stroke based on such factors as fluid type, maximum flow rate, outlet pressure, and bore size.

Because the high pressure fluid circuit 26 causes the fluid to change flow direction before entering the regulating chamber 28, the high pressure fluid circuit increases turbulence in the fluid. As a result, heat transfer between the body 14 and the fluid is improved compared with prior regulators. In addition, because the length of the high pressure fluid circuit 28 is approximately 2.5 times the length of the body 14, contact time and contact length between the body 14 and the fluid is improved, thereby improving heat transfer between the body 14 and the fluid.

The tower 64 normally mates with a surface 74 of the block 14 under the force of the main spring 60. An O-ring 76 situated in a groove in the tower seals the regulating chamber 28. In the event that pressure in the chamber 28 exceeds a predetermined level, the tower 64 separates from the surface 74 and the excess pressure blows by the O-ring 76 and vents through a port 78 to the atmosphere.

Figure 3:
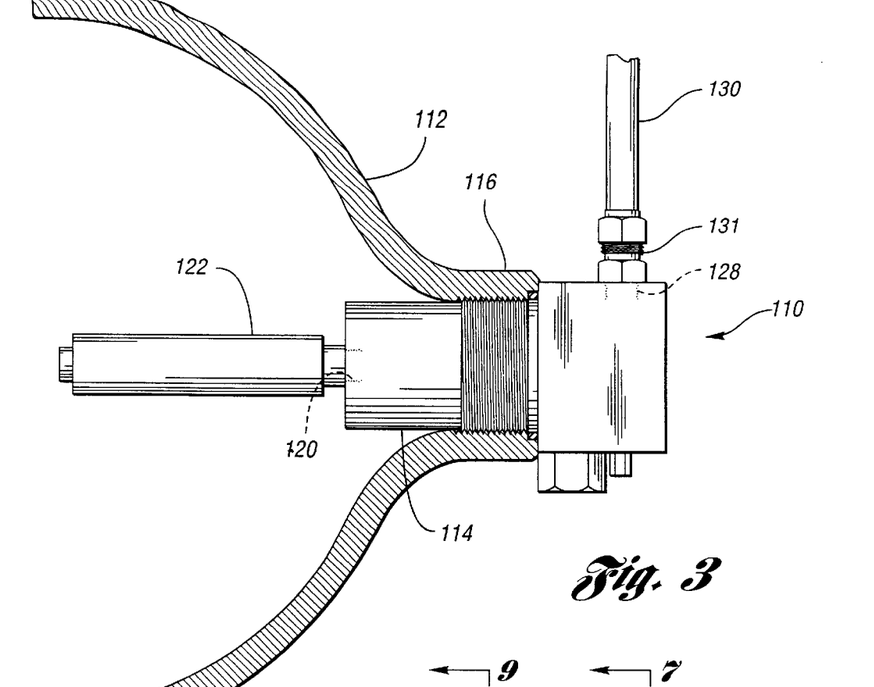
FIG. 3 is a top view of a second embodiment of the pressure regulator mounted to a tank.
Figure 4:
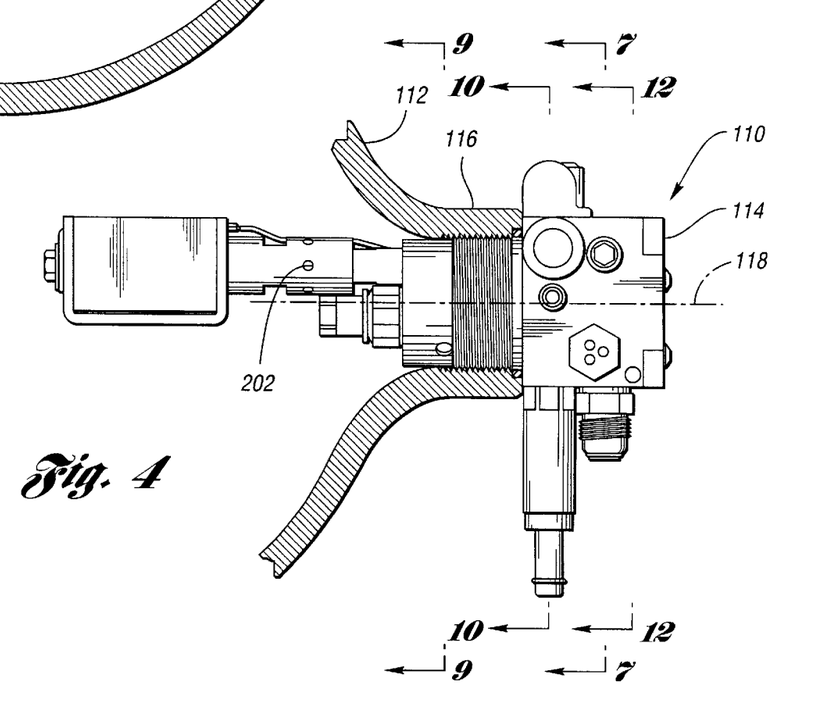
FIG. 4 is a side view of the second embodiment of the pressure regulator.
Figure 5:
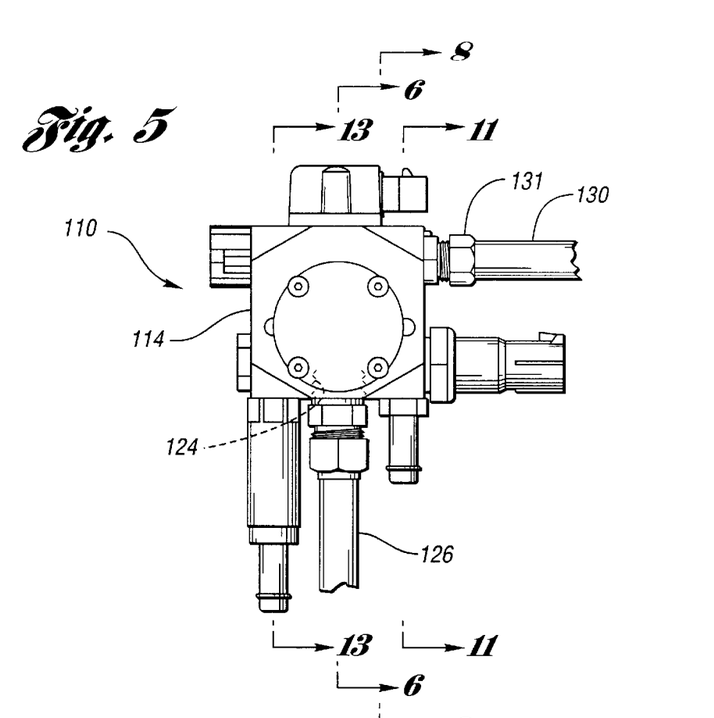
FIG. 5 is an end view of the second embodiment of the pressure regulator.

FIGS. 3 through 5 show a second embodiment 110 of the pressure regulator according to the present invention for regulating outlet pressure of a fluid contained in a cylinder or tank 112. In a preferred embodiment where the tank 112 is fitted in a vehicle, the fluid may for example be compressed natural gas, liquified natural gas, propane, hydrogen or other fuel. In other applications, the fluid may be for example carbon dioxide, oxygen or other commercial gases, or pressurized liquids.

The regulator 110 includes a body 114 threadably engaged with a neck 116 of the tank 112. The body 114 and the neck 116 preferably share a common central axis 118. The body 114 has an inlet 120 connected to a solenoid 122, which is disposed in the tank 112. Furthermore, the body 114 has an outlet 124 connected to a low pressure line 126 for supplying regulated fluid to, for example, a vehicle engine. The body 114 may have an additional inlet 128 that may be connected to one or more additional tanks (not shown) or other fluid sources such as with a common manifold 130 and a fitting 131.

Referring to FIGS. 4 through 9, the regulator 110 further has a high pressure fluid circuit 132 for routing high pressure fluid from one or both of the inlets 120 and 128 to a low pressure chamber or pressure regulating chamber 134, which is disposed in the body 114 and located outside of the tank 112. The fluid circuit 132 includes a plurality of longitudinally extending passages such as first, second and third longitudinal passages 136, 138 and 140, respectively. The third longitudinal passage 140 includes a high pressure cavity 141 and a bore 142. The fluid circuit 132 further includes a plurality of laterally extending passages such as a first lateral passage 143 disposed between the first and second longitudinal passages 136 and 138, respectively, and a second lateral passage 144 disposed between the second and third longitudinal passages 138 and 140, respectively. With such a configuration, heat transfer between the body 114 and the fluid can be maximized as explained below in greater detail.

While the fluid circuit 132 may be formed in any suitable manner, the fluid circuit 132 is preferably formed by drilling the body 114.

Because the solenoid 122 may also be considered part of the regulator 110, the fluid circuit 132 may further include an additional longitudinal passage or solenoid passage 145, and an additional lateral passage or inlet lateral passage 146 disposed between the solenoid passage 145 and the first longitudinal passage 136. These passages 145 and 146 further improve heat transfer between the body 114 and the fluid.

It should be noted that FIGS. 6 through 9 show one possible configuration of the fluid circuit 132. However, the fluid circuit 132 may have any suitable configuration that preferably includes at least two longitudinally extending high pressure passages in fluid communication with each other. Furthermore, one longitudinally extending passage preferably transmits fluid in a first direction, and another longitudinally extending passage transmits the fluid in a second direction different than, and preferably opposite, the first direction, as explained below in greater detail.

It should also be noted that the term longitudinally extending passage as used in this application may refer to a passage that extends laterally in addition to extending longitudinally. For example, a longitudinally extending passage of a regulator according to the invention may extend at an angle between ends of the regulator.

Figure 6:
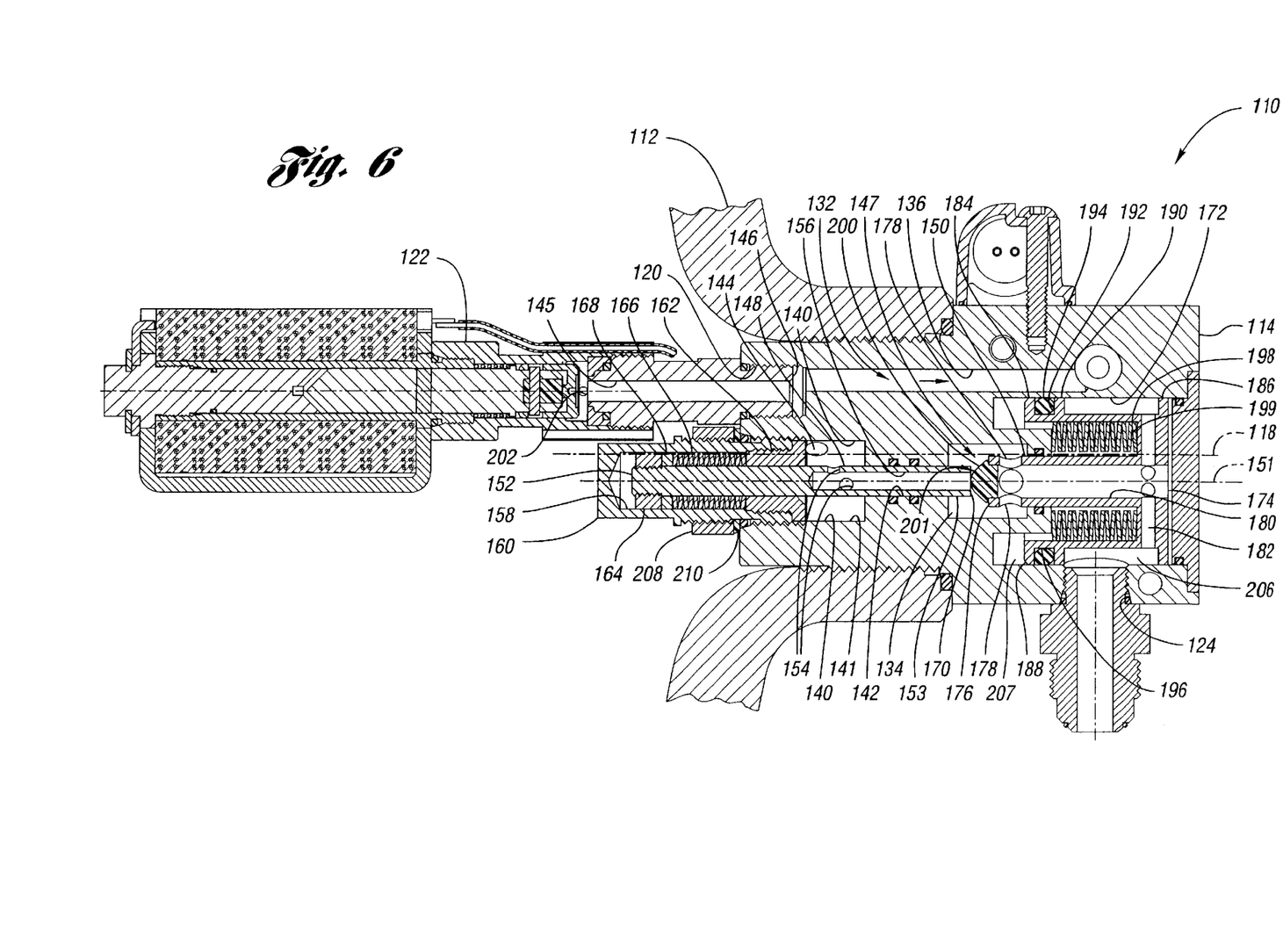
FIG. 6 is a cross-sectional view of the second embodiment of the pressure regulator taken along line 6—6 of FIG. 5.
Figure 7:
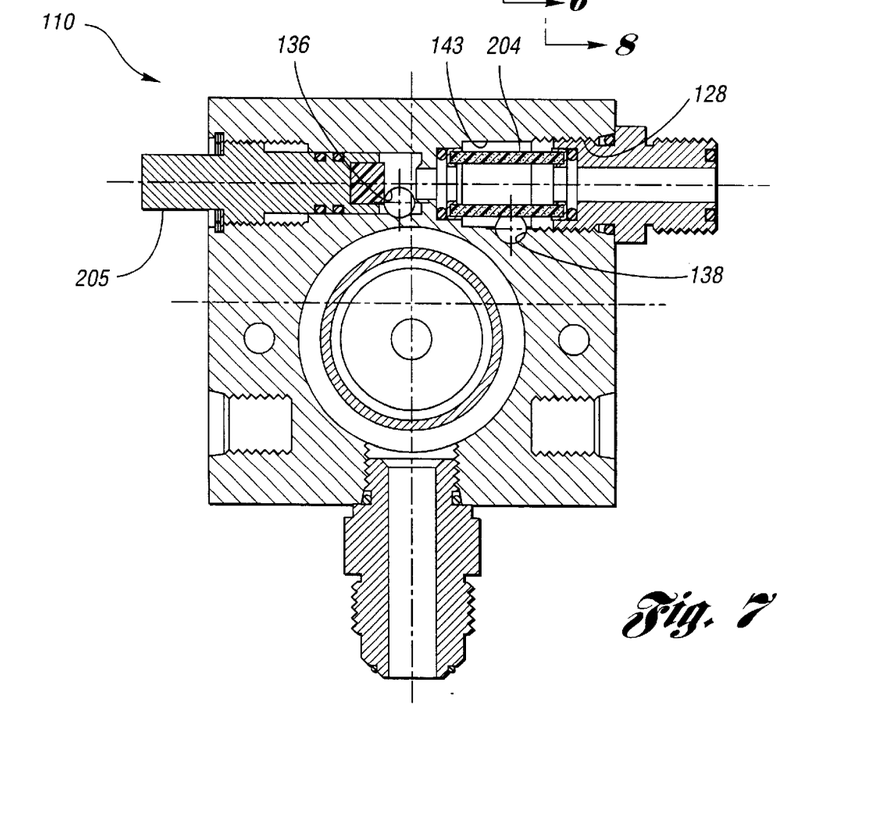
FIG. 7 is a cross-sectional view of the second embodiment of the pressure regulator taken along line 7—7 of FIG. 4.
Figure 8:
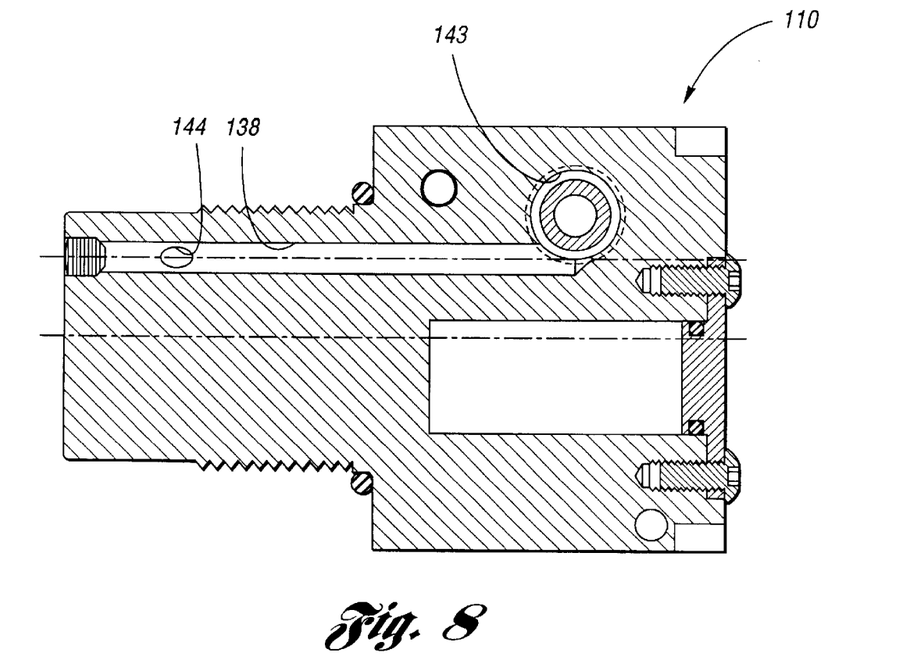
FIG. 8 is a cross-sectional view of the second embodiment of the pressure regulator taken along line 8—8 of FIG. 5.
Figure 9:
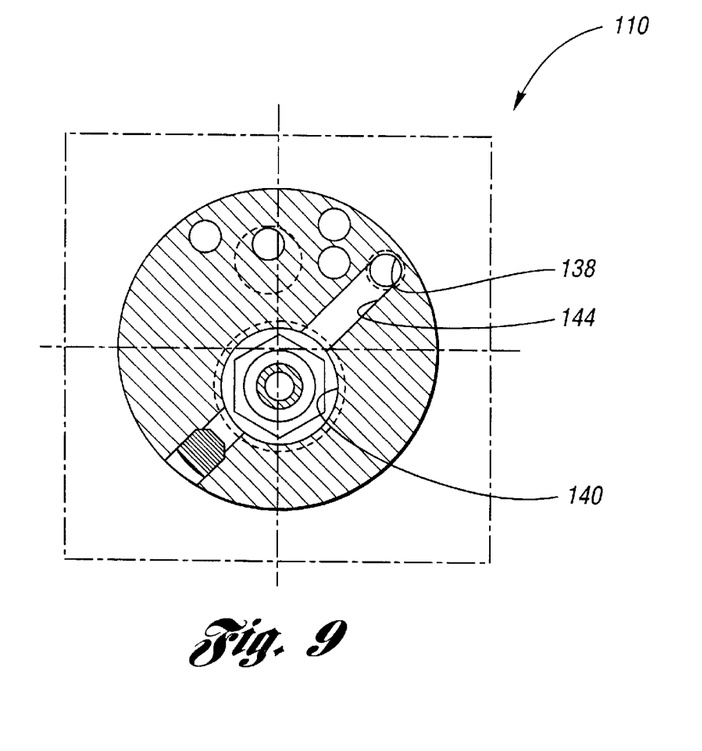
FIG. 9 is a cross-sectional view of the second embodiment of the pressure regulator taken along line 9—9 of FIG. 4.

As shown in FIG. 6, the regulator 110 also includes a pressure regulating device 147 that extends into the pressure regulating chamber 134 for reducing pressure of the fluid.

While the pressure regulating device 147 may have any suitable configuration and include any suitable components, such as a single piston, in a preferred embodiment the pressure regulating device 147 includes a first or compensation piston 148 and a second or main piston 150. The pistons 148 and 150 preferably have a common central axis 151 that is offset from the central axis 118 so as to provide sufficient space for the fluid circuit 132.

The compensation piston 148 is situated in the bore 142 and extends between the pressure regulating chamber 134 and the high pressure cavity 141. The compensation piston 148 has first and second ends 152 and 153, respectively. The compensation piston 148 further has a plurality of circumferentially distributed apertures 154, and an axial bore 156 that defines or forms at least a portion of the third longitudinal passage 140.

The first end 152 of the compensation piston 148 extends into a central bore 158 of an end cap or adjuster 160 that is threadably engaged with the body 114. A hollow bushing 162 is disposed between the compensation piston 148 and the adjuster 160, and is threadably engaged with the adjuster 160. A nut 164 is threadably engaged with the first end 152, and retains a compensation spring 166 between a shim 168 and the bushing 162. When the compensation spring 166 is compressed, the compensation spring 166 bears against the shim 168, and biases the compensation piston 148 in a first axially direction away from the main piston 150.

The second end 153 of the compensation piston 148 includes an annular face 170, which functions as the pressure regulating point or point at which pressure reduction occurs. The face 170 preferably, but not necessarily, has a narrow radially extending width in the range of 0.003 to 0.015 inches.

The main piston 150 is situated in a main piston cavity 172 of the body 114, and has first and second open ends 174 and 176, respectively. The main piston 150 further has a plurality of circumferentially distributed apertures 178, an axial bore 180, and one or more radially extending apertures 182 in fluid communication with the outlet 124. Main piston 150 moves axially in cavity 172 to maintain a desired outlet pressure. Annular extending flange portions or lands 184 and 186 engage an internal surface of the cavity 172 and provide axial guidance. The total clearance between the lands 184 and 186 is preferably relatively small, such as 0.0005 inches, to limit tilting of the main piston 150. For example, with a main piston diameter of 1.3995 inches, the nominal maximum tilt would be lass than 0.04°. In addition, the land 184 may be provided with a chamfer 188 to reduce friction.

An additional flange portion or land 190 cooperates with the land 184 to define an annular channel or gland 192 for receiving a seal 194, which is preferably an o-ring. The land 190, however, has a smaller diameter than the lands 184 and 186 so that the land 190 does not contact the internal surface of the cavity 172. With such a configuration, friction between the main piston 150 and the cavity 172 is minimized, while enhancing fit tolerance between the main piston 150 and the cavity 172.

The gland 192 and seal 194 provide a significantly improved sealing arrangement compared with prior sealing arrangements. The flanges 184 and 190 are configured to provide no axial clearance between the gland 192 and the seal 194. Furthermore, the flanges 184 and 190 each have a radial height that preferably permits the seal 194 to contact the body 114 and a base 196 of the gland 192, while experiencing essentially no radial squeeze. With such a configuration, the seal 194 will not move from one side of the gland 192 to the other when the main piston 150 reverses direction. Consequently, passage of fluid around the seal 194 is significantly reduced or eliminated. Furthermore, rolling of the seal 194 is inhibited, thereby reducing friction and wear.

A main spring 198 is disposed in an annular chamber 199 defined by the main piston 150. When the main spring 198 is compressed, the main spring 198 biases the main piston 150 in a second axial direction away from, and preferably directly opposite from, the direction in which the compensation piston 148 is biased.

Furthermore, a seal or seat 200 is attached to the second end 176 of the main piston 150. The seat 200 preferably has a spherical surface 201 that engages the face 170 of the compensation piston 148. Such a configuration provides high sealing pressure with very little rise in outlet pressure. While the seat 200 may comprise any suitable material, such as brass or aluminum, the seat 200 preferably comprises a relatively hard thermoplastic material such as VESPEL™.

Referring to FIGS. 6 through 9, operation of the regulator 110 will now be described. When the solenoid 122 is energized, fluid from the tank 112 will enter solenoid passage 14S through one or more openings 202 in the solenoid 122. Next, fluid enters the regulator 110 through the inlet 120. Fluid is then routed through the inlet lateral passage 146 and into the first longitudinal passage 136. Next, the fluid is routed through the first lateral passage 143 and into a particulate filter 204 disposed in first lateral passage 143. Filter 204 may have any suitable construction such as pleated wire cloth or sintered stainless steel. A manual shutoff valve 205 is preferably disposed in the opposite end of first lateral passage 143 for inhibiting or shutting off the flow of fluid from the first longitudinal passage 136 into the filter 204.

After passing through the filter 204, the fluid enters second longitudinal passage 138, and then second lateral passage 144. Next, the fluid passes into high pressure cavity 141, through apertures 154 and into bore 156 of compensation piston 148.

Thus, fluid passing from the tank 112 and through the regulator 110 changes flow direction five times (not including the change in flow direction as the fluid passes through openings 202 and into solenoid passage 145) before reaching the face 170 of the compensation piston 148. These changes in flow direction increase turbulence in the fluid and improve heat transfer between the body 114 and the fluid. In addition, because the length of the high pressure circuit 132 is approximately 2.5 to 3 times the length of the body 114, contact time and contact length between the body 114 and the fluid is maximized, thereby maximizing heat transfer between the body 114 and the fluid.

As previously mentioned, fluid may also be supplied to the regulator 110 from one or more additional tanks (not shown). Such fluid enters the regulator 110 through inlet 128. This fluid passes through filter 204 and into second longitudinal passage 138, where it then follows the same flow path as fluid from the tank 112. Thus, fluid from the one or more additional tanks changes flow direction three times before reaching the face 170 of the compensation piston 148. Furthermore, the length of the portion of the high pressure circuit 132 through which such fluid passes is about 1.5 to 2 times the length of the body.

Clearances of various components of the regulator 110 are designed so that the same fluid pressure exists in the central bore 158 of adjuster 160 as in the high pressure cavity 141. For example, fluid preferably passes through an annular space between the compensation piston 148 and the bushing 162, and into the central bore 158. Thus, inlet pressure from the tank 112 acts on the nut 164 and the first end 152 of the compensation piston 148 so as to urge the compensation piston 148 against the bias of the compensation spring 166 and toward the main piston 150. Alternatively or supplementally, the bore 156 of the compensation piston 148 may extend to the first end 152 so as to allow fluid to pass into the central bore 158. As yet another alternative, the nut 164 may be eliminated, and the compensation piston 148 may be provided with an enlarged head at the first end 152.

In the preferred embodiment, the maximum stroke of the compensation piston 148 is in the range of about 0.075 to 0.150 inches. However, the compensation piston 148 may have any suitable stroke based on such factors as fluid type, maximum flow rate, inlet pressure, outlet pressure, and bore size. Furthermore, the stroke of the compensation piston 148 is preferably correlated to the stroke of the main piston 150 so that the regulator 110 provides a constant outlet pressure for any inlet pressure.

Fluid passes from the bore 156 of the compensation piston 148 around the seat 200 and into the pressure regulating chamber 134, where the fluid is now at the desired outlet pressure. From the pressure regulating chamber 134, the fluid normally passes through the apertures 179 and into the bore 180 of the main piston 150. Next, the fluid passes through the apertures 182 into an annular cavity 206 and out the outlet 124.

While the outlet 124 is shown extending out the bottom of the regulator, the outlet 124 may extend out of any suitable surface of the regulator 110. For example, the outlet 124 may extend out an end surface of the regulator 110. Furthermore, the outlet 124 may be aligned with the axis 151 shown in FIG. 6.

While each spring 166 and 198 may be any suitable type of spring such as a coil spring, in a preferred embodiment each spring 166 and 198 comprises a plurality of Belleville washers. Furthermore, the springs 166 and 198 are preferably ratio-metric (i.e., the spring constants are proportional), and are chosen so that a constant outlet pressure is attained at the outlet 124 for normal flow rates and for normal operating tank pressures. In a natural gas vehicle, the target outlet pressure is normally about 100 psig for tank pressures of about 125–4,500 psig. The outlet pressure acts on the land 184 and seal 194 to move the main piston 150 against the bias of the main spring 198 and atmospheric pressure in chamber 207, which is in communication with the atmosphere through a suitable port (not shown). If the outlet pressure exceeds the desired value, the main piston 150 is driven toward the compensation piston 148 such that the seat 200 mates with the face 170 of the compensation piston 148 to inhibit flow out of the tank 112. If the outlet pressure then drops below a threshold, as for example when a fuel injector might demand more fuel for delivery to an engine, the main piston 150 is biased away from the compensation piston 148, the seat 200 separates from the face 170, and the flow of fluid out of the tank 112 resumes.

In the preferred embodiment, the main piston 150 has a stroke of about 0.0009 inches at 4,500 psig, and about 0.008 inches at 500 psig tank pressure. However, the main piston 36 may have any suitable stroke based on such factors as fluid type, maximum flow rate, outlet pressure, and bore size.

Outlet pressure may be adjusted by moving the location of the face 170, which is the pressure regulating point. This is accomplished by rotating the adjuster 160, which causes the compensation piston 148 to move axially. Rotation of the adjuster 160 in a first direction causes the compensation piston 148 to move away from the main piston 150, thereby increasing outlet pressure. Rotation of the adjuster in a second direction, opposite the first direction, causes the compensation piston 148 to move toward the main piston 150, thereby decreasing outlet pressure. Once a desired outlet pressure is set, the position of the adjuster 160 may be locked by turning a jam nut 208 until the jam nut 208 and a jam washer 210 are tight against the body 114. Preferably, neither the compensation spring 166 nor the main spring 198 has any pre-load. The loads on the compensation spring 166 and main spring 198 are preferably created solely by the inlet pressure and outlet pressure, respectively.

Referring to FIGS. 4, 5 and 10–13, the regulator 110 also preferably includes a heating arrangement 212 for sufficiently heating the regulator 110 such that the regulator 110 can function properly when fluid passes through the regulator 110 and out of the outlet 124. For example, the regulator 110 may require heating so as to inhibit formation of hydrate, which is a spongy, ice-like material formed from entrained water and methane that may be present in the fluid. The heating arrangement 212 includes an inlet fitting 214 connected to a heating fluid inlet 215 for receiving a heating fluid, such as vehicle engine coolant; a heating fluid circuit 216 for routing the heating fluid through the regulator 110; and an outlet fitting 218 connected to a heating fluid outlet 219. The heating fluid circuit 216 includes a plurality of laterally extending passages such as first, second, third, fourth and fifth lateral passages 220, 222, 224, 226 and 228, respectively, and a plurality of longitudinally extending passages such as first and second longitudinal passages 230 and 232, respectively. Open ends of passages 222, 224, 226, 230 and 232 are preferably sealed with ball-type plugs 234.

Heating fluid enters the regulator 110 through inlet fitting 214. Next, heating fluid flows upwardly through first lateral passage 220, then turns 90° and flows into first longitudinal passage 230. Next, the heating fluid turns 90° and flows downwardly through second lateral passage 222. The heating fluid then turns 90° and flows through third lateral passage 224. Next, the heating fluid turns 90° and flows vertically through fourth lateral passage 226. The heating fluid again turns 90° and flows through second longitudinal passage 232 until the fluid intersects the fifth lateral passage 228. Next, the heating fluid turns 90° and flows vertically through the fifth lateral passage 228 and out the outlet fitting 218. Thus, the heating fluid circuit 216 includes six portions at which flow of the heating fluid changes direction. Such changes in flow direction increase turbulence and, therefore, improve heat transfer between the heating fluid and the body 114 of the regulator 110. Furthermore, the heating fluid circuit 216 preferably has a length in the range of 8 to 12 inches to improve contact time and contact length between the heating fluid and the body 114.

Figures 10, 11:
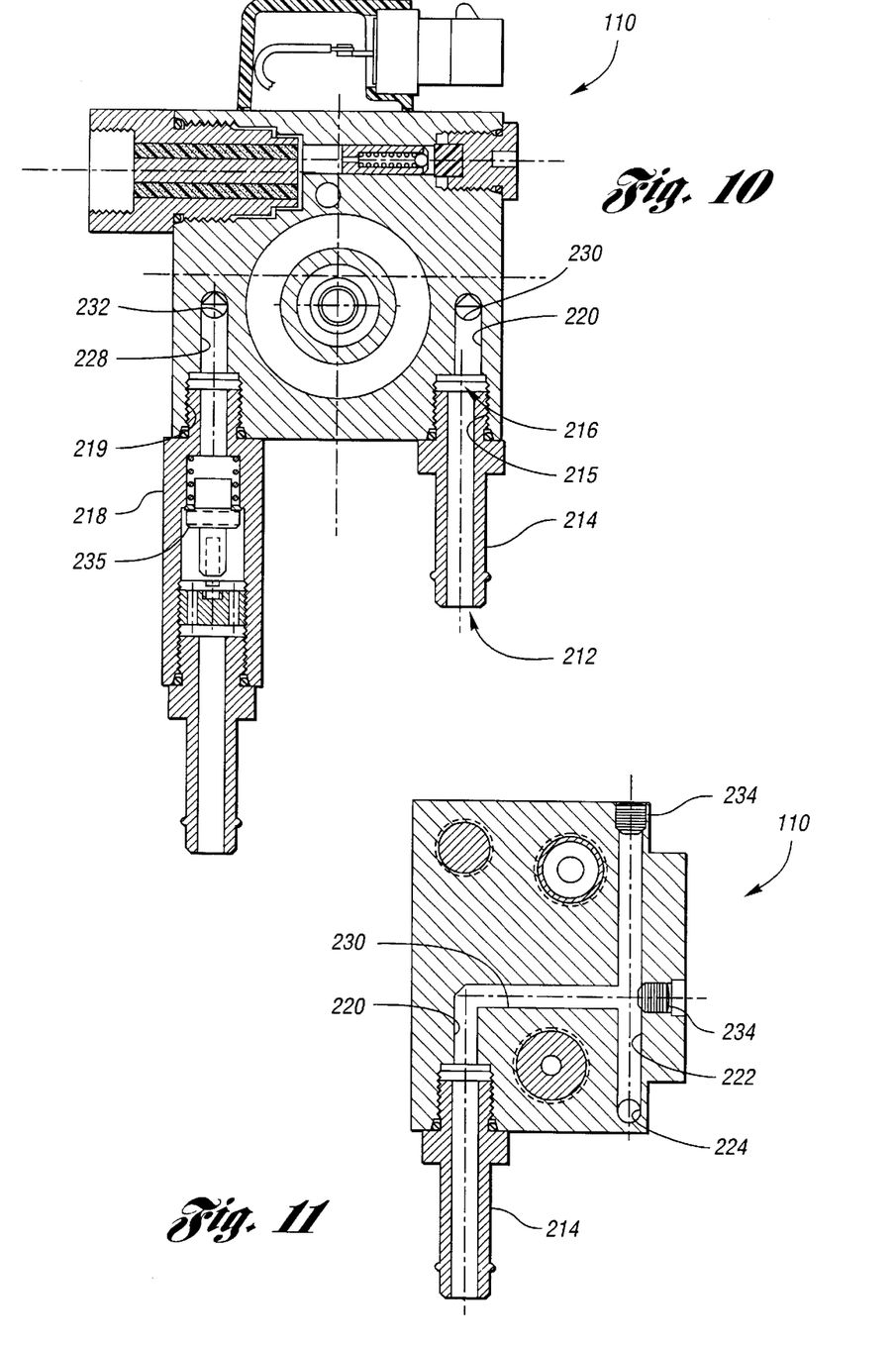
FIG. 10 is a cross-sectional view of the second embodiment of the pressure regulator taken along line 10—10 of FIG. 4.
FIG. 11 is a cross-sectional view of the second embodiment of the pressure regulator taken along line 11—11 of FIG. 5.
Figure 12:
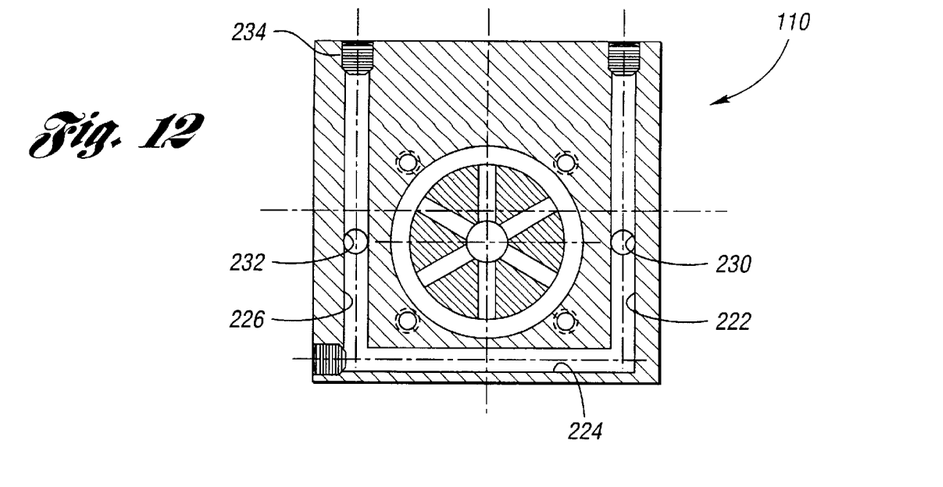
FIG. 12 is a cross-sectional view of the second embodiment of the pressure regulator taken along line 12—12 of FIG. 4.
Figure 13:
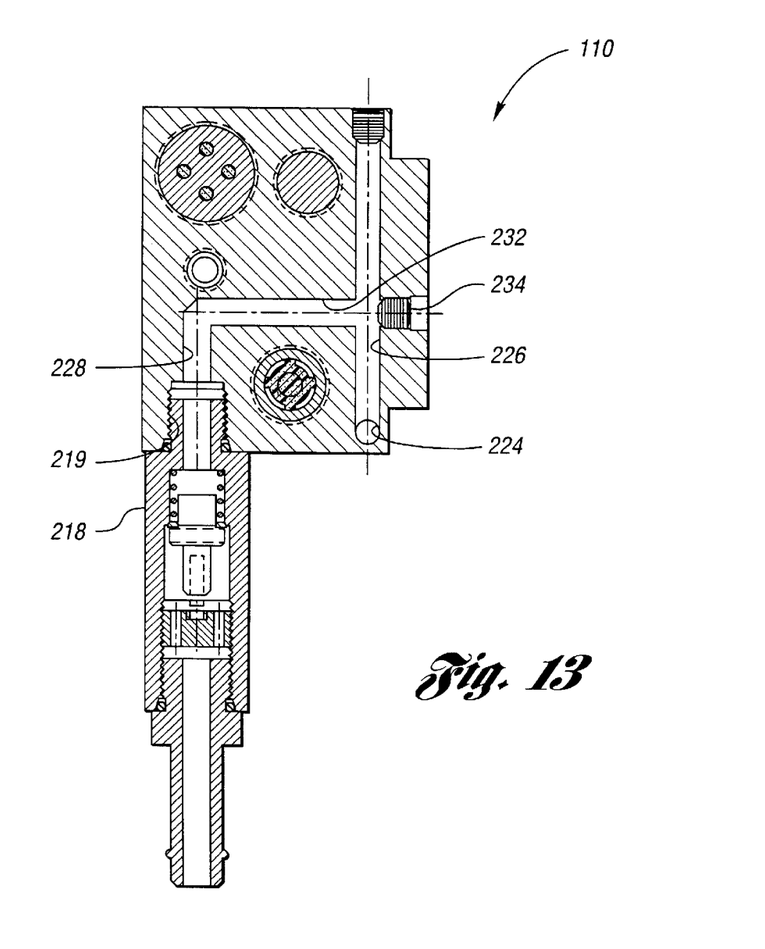
FIG. 13 is a cross-sectional view of the second embodiment of the pressure regulator taken along line 13—13 of FIG. 5.

As shown in FIG. 10, the inlet fitting 214 is preferably axially offset from the first lateral passage 220 so as to further increase turbulence. The inlet fitting 214 and first lateral passage 220 are also preferably disposed adjacent or proximate the pressure regulating chamber 134 so that heating fluid will enter the regulator 110 proximate the regulating chamber 134.

As further shown in FIG. 10, the heating arrangement 212 may also include a thermostat 235 for sensing temperature of the heating fluid. The thermostat 235 is preferably mounted proximate the outlet fitting 218, or combined with the outlet fitting 218. Furthermore, the thermostat 235 allows the heating fluid to flow through the heating fluid circuit 216 if the temperature of the heating fluid is at or below a threshold temperature of, for example, approximately 170° F. At temperatures above 170° F., the thermostat 235 stops the flow of heating fluid so that the temperature of the body 14 will remain at approximately 170° F. or below under normal operating conditions. Thus, the thermostat 235 functions as a flow regulator.

Figure 14:
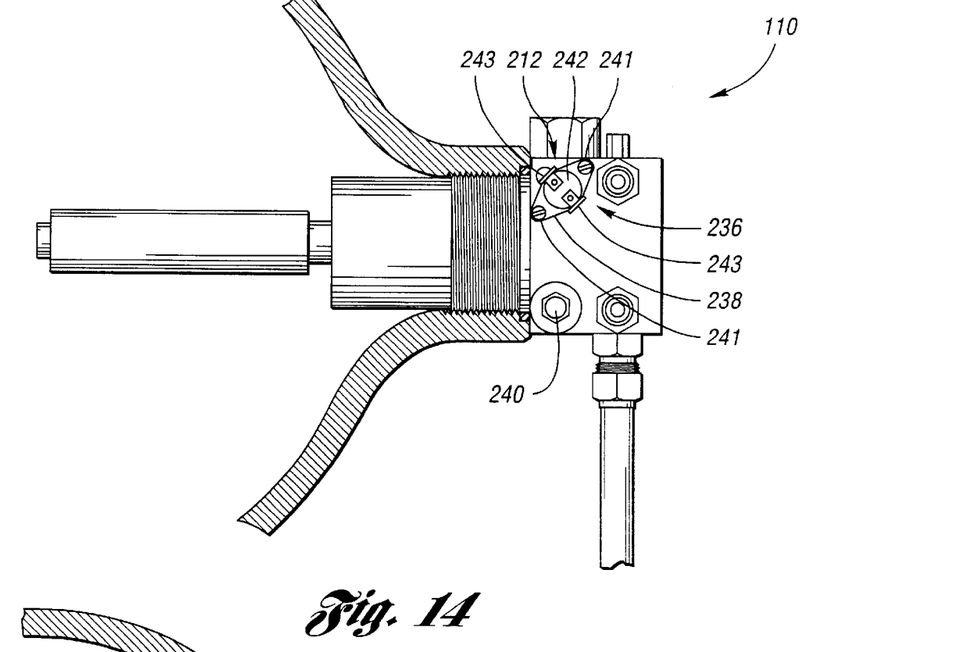
FIG. 14 is a bottom view of the second embodiment of the pressure regulator.

As an alternative or supplement to the thermostat 235, the heating arrangement 212 may be provided with a flow control device 236, as shown in FIG. 14, for controlling flow of the heating fluid so as to regulate temperature of the body 114 and/or fluid flowing through the regulator 110. The control device 236 included an electrical switch 238, such as a bi-metal snap action electrical switch, connected to a flow regulator such as a solenoid 240 disposed in the heating fluid circuit 216. For example, the solenoid 240 may be disposed in the fourth lateral passage 226.

The switch 238 is attached to the body 114 such as with screws 241, and includes a sensing element 242 and terminals 243 that are electrically connected to the solenoid 240. The sensing element 242 is preferably used to sense temperature of fluid flowing through the regulator 110. For example, the sensing element 242 may be used to sense temperature of the fluid at or downstream of the pressure regulating chamber 134. Alternatively or supplementally, because the fluid will not get hotter than the body 114, the sensing element 242 may be used to sense temperature of the body 114. If the temperature of the body 114 and/or fluid falls below a first threshold temperature, such as 150° F., the switch 238 closes and energizes the solenoid 240. When energized, the solenoid 240 allows heating fluid to flow through the heating fluid circuit 216. If the temperature of the body 114 and/or fluid rises above a second threshold temperature, such as 175° F., the switch 238 opens and de-energizes the solenoid 240. When de-energized, the solenoid 240 inhibits flow of heating fluid through the heating fluid circuit 216.

Figure 15:
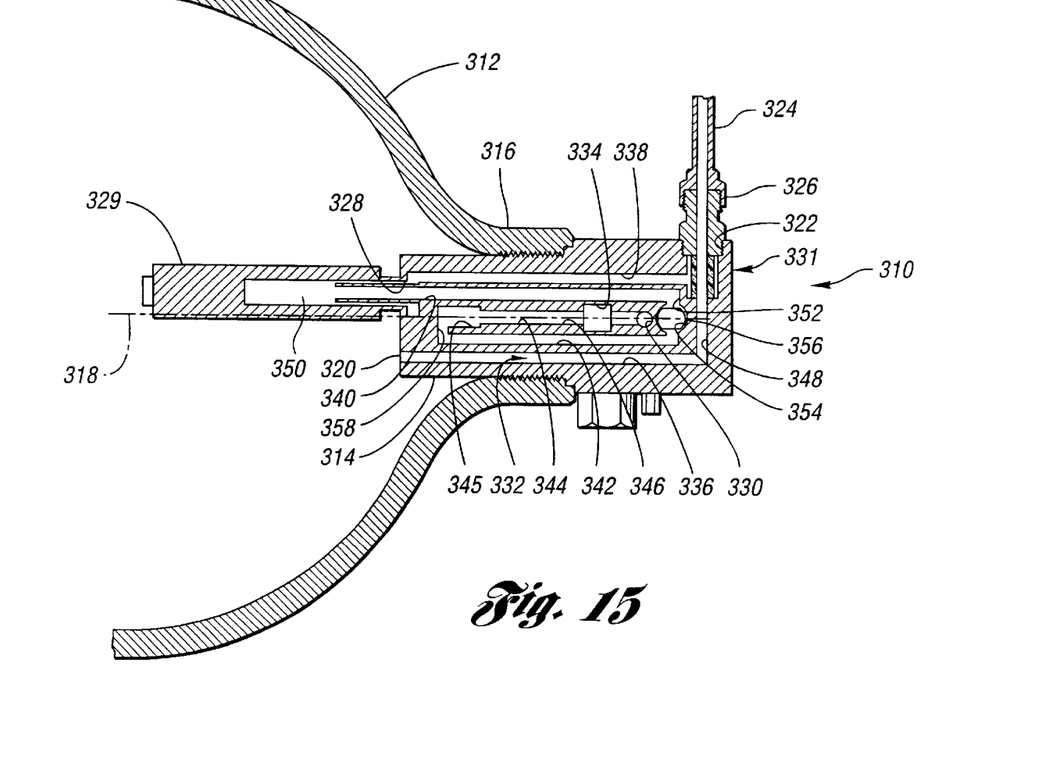
FIG. 15 is a schematic top cross-sectional view of a third embodiment of the pressure regulator.

FIG. 15 shows a third embodiment 310 of the regulator according to the invention for regulating outlet pressure of fluid contained in a tank 312. Like regulator 110, regulator 310 includes a body 314 threadably engaged with a neck 316 of the tank 312. The body 314 and the neck 316 preferably share a common central axis 318. The body 314 has a first inlet 320 in fluid communication with the tank 312, and a second inlet 322 that may be connected to one or more additional tanks (not shown) or other fluid sources such as with a common manifold 324 and a fitting 326. Furthermore, the body 314 has a port 328 connected to a solenoid 329, which may be considered part of the regulator 310, and an outlet 330 connected to a low pressure line (not shown) for supplying regulated fluid to, for example, a vehicle engine. The outlet 330 preferably extends out of the bottom of the regulator 310. Alternatively, the outlet 330 may extend out any suitable surface of the body 314, such as and end surface 331.

The regulator 310 further has a high pressure fluid circuit 332 formed in the body 314 for routing high pressure fluid from one or both of the inlets 320 and 322 to a low pressure chamber or pressure regulating chamber 334. It should be noted that FIG. 15 is a schematic view and not a planar cross-section. Therefore, while the entire fluid circuit 332 is shown in the same plane, the fluid circuit 332 is preferably not disposed in the same plane.

The fluid circuit 332 includes a plurality of longitudinally extending passages such as first, second, third, fourth and fifth longitudinal passages 336, 338, 340, 342 and 344, respectively. The fifth longitudinal passage 344 preferably includes a high pressure cavity 345 and a bore 346 similar to the high pressure cavity 141 and bore 142, respectively, of the regulator 110. The fluid circuit 332 further includes a plurality of laterally extending passages such as a first lateral passage 348 disposed between the first and second longitudinal passages 336 and 338, respectively, and a second lateral passage 350 defined by the solenoid 329 and disposed between the second and third longitudinal passages 338 and 340, respectively. A third lateral passage 352 extends between the third and fourth longitudinal passages 340 and 342, respectively, and includes a cavity 354 for receiving a valve 356, such as a ¼ turn shutoff valve. The fluid circuit 332 further includes a fourth lateral passage 358 extending between the fourth and fifth longitudinal passages 342 and 344, respectively.

With such a configuration of the fluid circuit 332, fluid passing from the tank 312 and through the regulator 310 changes flow direction seven times before reaching the pressure regulating chamber 334. Similarly, fluid that enters the regulator 310 through the second inlet 322 changes flow direction six times before reaching the pressure regulating chamber 334. These changes in flow direction increase turbulence in the fluid and improve heat transfer between the body 314 and the fluid. In addition, because the length of the fluid circuit 332 is approximately 5 times the length of the body 314, the regulator 310 provides a greater body-surface to fluid-volume ratio than the regulator 110.

Advantageously, the solenoid 329 and valve 356 control flow of fluid from the tank 312, as well as any other tank or fluid source connected to the second inlet 322. For example, the solenoid 329 or the valve 356 may be used to shut off flow of fluid from the tank 312, as well as any other tank or fluid source. As a result, the other tanks or fluid sources may be provided without a solenoid and/or shutoff valve.

The regulator 310 further includes the other features described above with respect to the regulator 110, and functions in a similar manner. For example, the regulator 310 includes a pressure regulating device (not shown) that is in communication with the pressure regulating chamber 334, and the pressure regulating device is preferably similar to the pressure regulating device 147 of the regulator 110. When viewed from the side, the pressure regulating device of the regulator 310 also preferably has an axis that is offset from the axis 318, so that significant space is provided for the fluid circuit 332.

While embodiments of the invention have been illustrated and described, it is not intended that these embodiments illustrate and describe all possible forms of the invention. For example, while the embodiments shown are adapted to be mounted directly to a tank, a regulator according to the invention may also be mounted downstream of a tank. It should be understood that the words used in the specification are words of description rather than limitation, and those familiar with the art to which this invention relates will recognize various alternative designs and embodiments for practicing the invention as defined by the following claims.

What is claimed is:

1. A regulator for regulating outlet pressure of a fluid supplied to the regulator from a fluid source, the regulator comprising:

a body having an inlet;

a pressure regulating chamber disposed in the body; and a high pressure fluid circuit extending between the inlet and the pressure regulating chamber for transmitting the fluid from the inlet to the pressure regulating chamber, the high pressure fluid circuit including a longitudinally extending high pressure passage that extends longitudinally away from the inlet and beyond the pressure regulating chamber.

2. The regulator of claim 1 wherein the high pressure circuit further includes an additional longitudinally extending high pressure passage disposed between the longitudinally extending high pressure passage and the pressure regulating chamber.

3. The regulator of claim 1 further comprising:
a first piston having a first bore and an end disposed proximate the pressure regulating chamber, the first piston being movable in response to pressure of the fluid supplied to the regulator;
a second piston having a second bore and an end disposed proximate the pressure regulating chamber, the second piston being movable toward and away from the end of the first piston in response to the outlet pressure;
the ends of the first and second pistons being separated by a first distance to allow the fluid to flow from the fluid source, through the first bore, then through the second bore, and the ends of the first and second pistons being positioned closer together than the first distance to inhibit flow from the fluid source when the outlet pressure reaches a threshold;
wherein the body has a first axis, and the pistons have a common second axis offset from the first axis.

4. The regulator of claim 3 wherein the first bore of the first piston defines at least a portion of the additional longitudinally extending high pressure passage.

5. The regulator of claim 1 further comprising a tower disposed in the body and defining the regulating chamber, the tower mating with a surface of the body, and separating from the surface when pressure in the regulating chamber exceeds a predetermined level.

6. A regulator for regulating outlet pressure of a fluid supplied to the regulator from a fluid source, the regulator comprising:
a body having an inlet;
a pressure regulating chamber disposed in the body; and
a high pressure fluid circuit extending between the inlet and the pressure regulating chamber for transmitting the fluid from the inlet to the pressure regulating chamber, the high pressure fluid circuit including at least two longitudinally extending high pressure passages in fluid communication with each other, wherein one longitudinally extending high pressure passage transmits the fluid in a first direction, and another longitudinally extending high pressure passage transmits the fluid in a second direction different than the first direction.

7. The regulator of claim 6 wherein the first direction is axially opposite the second direction.

8. The regulator of claim 6 wherein the one longitudinally extending high pressure passage extends longitudinally away from the inlet to a point beyond the pressure regulating chamber.

9. The regulator of claim 6 wherein the high pressure fluid circuit comprises at least three longitudinally extending high pressure passages in fluid communication with each other and disposed between the inlet and the pressure regulating chamber for transmitting the fluid from the inlet to the pressure regulating chamber.

10. The regulator of claim 6 wherein the high pressure fluid circuit comprises at least four longitudinally extending high pressure passages in fluid communication with each other and disposed between the inlet and the pressure regulating chamber for transmitting the fluid from the inlet to the pressure regulating chamber.

11. The regulator of claim 6 wherein the high pressure fluid circuit comprises at least five longitudinally extending high pressure passages in fluid communication with each other and disposed between the inlet and the pressure regulating chamber for transmitting the fluid from the inlet to the pressure regulating chamber.

12. The regulator of claim 6 wherein the body further comprises a heating fluid circuit for routing heating fluid through the regulator, the heating fluid circuit having a configuration that includes at least five portions at which flow of the heating fluid changes direction.

13. The regulator of claim 6 wherein the body further comprises a heating fluid circuit for routing heating fluid through the regulator, the heating fluid circuit having a configuration that includes at least six portions at which flow of the heating fluid changes direction.

14. The regulator of claim 6 wherein the body further comprises a heating fluid circuit including a heating fluid inlet, a heating fluid outlet, at least two longitudinally extending heating fluid passages, and at least five laterally extending heating fluid passages in fluid communication with the longitudinally extending heating fluid passages, the heating fluid passages being disposed between the heating fluid inlet and the heating fluid outlet and being configured to transmit heating fluid between the heating fluid inlet and the heating fluid outlet.

15. The regulator of claim 14 further comprising a flow regulator disposed in the heating fluid circuit.

16. A regulator for regulating outlet pressure of a fluid contained in a tank, the regulator comprising:
a body having an inlet adapted to be in fluid communication with the tank;
a pressure regulating chamber disposed in the body;
a high pressure fluid circuit extending between the inlet and the pressure regulating chamber for transmitting the fluid from the inlet to the pressure regulating chamber, the high pressure fluid circuit including at least two longitudinally extending high pressure passages in fluid communication with each other, wherein one longitudinally extending high pressure passage transmits the fluid in a first direction, and another longitudinally extending high pressure passage transmits the fluid in a second direction different than the first direction;
a first piston having an end disposed proximate the pressure regulating chamber, the first piston being movable in response to pressure in the tank when exposed to the pressure in the tank; and
a second piston having an end disposed proximate the pressure regulating chamber, the second piston being movable toward and away from the end of the first piston in response to the outlet pressure;
the ends of the first and second pistons being separated by a first distance to allow the fluid to flow out of the tank, and the ends of the first and second pistons being positioned closer together than the first distance to inhibit flow out of the tank when the outlet pressure reaches a threshold.

17. The regulator of claim 16 wherein the first direction is axially opposite the second direction.

18. The regulator of claim 16 wherein the one longitudinally extending high pressure passage extends longitudinally away from the inlet to a point beyond the pressure regulating chamber.

19. The regulator of claim 16 wherein the high pressure fluid circuit comprises at least three longitudinally extending high pressure passages in fluid communication with each other.

20. The regulator of claim 16 wherein the high pressure fluid circuit comprises at least four longitudinally extending high pressure passages in fluid communication with each other.

21. The regulator of claim 16 wherein the high pressure fluid circuit comprises at least five longitudinally extending high pressure passages in fluid communication with each other.

22. The regulator of claim 16 wherein the first piston further has a first axial bore that defines at least a portion of one of the longitudinally extending high pressure passages.

23. The regulator of claim 22 wherein the body further has an outlet, and the second piston has a second axial bore in fluid communication with the outlet such that the fluid flows through the second axial bore before flowing out of the outlet.

24. The regulator of claim 16 wherein the body further has an outlet, and the outlet and the pistons have a common axis.

25. The regulator of claim 16 wherein the body has a first axis, and the pistons have a common second axis offset from the first axis.

26. The regulator of claim 16 further comprising a first spring for biasing the first piston away from the second piston, a second spring for biasing the second piston away from the first piston, and an adjuster cooperable with one piston for moving the one piston with respect to the other piston without affecting spring load of either spring so as to adjust the outlet pressure.

* * * * *